United States Patent [19]

Hodges

[11] Patent Number: 5,526,863
[45] Date of Patent: Jun. 18, 1996

[54] TIRE WITH REDUCED BEAD MASS

[75] Inventor: Emory E. Hodges, Simpsonville, S.C.

[73] Assignee: Michelin Recherche et Technique S.A., Granges-Paccot, Switzerland

[21] Appl. No.: 228,838

[22] Filed: Apr. 18, 1994

[51] Int. Cl.$^6$ .......................... B60C 9/02; B60C 15/00; B60C 15/06
[52] U.S. Cl. .......................... 152/541; 152/539; 152/543; 152/546; 152/547; 152/550; 152/552; 152/554; 152/555
[58] Field of Search .................... 152/539, 541, 152/543, 546, 547, 550, 552, 554, 555

[56] References Cited

U.S. PATENT DOCUMENTS

| | | |
|---|---|---|
| 1,918,539 | 2/1933 | Handy . |
| 2,752,980 | 7/1956 | Riggs ........................ 152/541 |
| 3,052,275 | 9/1962 | Hylbert, Jr. . |
| 3,253,636 | 5/1966 | Travers ..................... 152/546 X |
| 3,807,476 | 4/1974 | Mills ........................ 152/541 X |
| 4,019,551 | 4/1977 | Kolowski et al. ............ 152/541 |
| 4,640,329 | 2/1987 | Nakasaki et al. . |
| 4,726,408 | 2/1988 | Alie et al. . |
| 4,766,940 | 8/1988 | Yokoyama et al. . |
| 4,779,659 | 10/1988 | Hanada et al. . |
| 4,872,497 | 10/1989 | Hanada et al. . |
| 5,007,472 | 4/1991 | Kuze et al. . |
| 5,048,584 | 9/1991 | Nakano et al. . |
| 5,085,260 | 2/1992 | Ueyoko et al. . |
| 5,234,043 | 8/1993 | Suzuki et al. ............... 152/546 X |
| 5,361,820 | 11/1994 | Adachi . |

FOREIGN PATENT DOCUMENTS

| | | |
|---|---|---|
| 2246406 | 5/1975 | France . |
| 2024119 | 1/1980 | United Kingdom .......... 152/541 |

OTHER PUBLICATIONS

The "Communication–European Search Report".
Patent Abstracts of Japan, vol. 7, No. 79 (M–204) [1224], Mar. 31, 1983 & JP-A-58-004610 (Yokohama Rubber Co. Ltd.).
Patent Abstracts of Japan, vol. 8, No. 227 (M–332), Oct. 18, 1984 & JP-A-59-109406 (Yokohama Rubber Co. Ltd.).

*Primary Examiner*—Adrienne C. Johnstone
*Attorney, Agent, or Firm*—Robert R. Reed; Russell W. Warnock

[57] ABSTRACT

The radial pneumatic tire of this invention has a reduced bead mass and improved rolling resistance. This is accomplished with less than a 5 percent reduction in the ability of the tire to sustain nominal loads and maintain tire endurance. The bead area has a profiled single bead filler that extends radially outward from the apex portion with an essentially constant thickness portion and a tapered portion. An outer filler strip extends from a point radially inward of the design rim flange near the bead core radially outward to a position near the mid height of the tire when the tire is mounted on the rim. The end result is a tire with smaller standard architectural components but very efficient load supporting and endurance capabilities. In one embodiment the outer filler strip extends radially outward beyond the radial extent of the single bead filler. In an equally effective embodiment the single bead filler extends radially outward beyond the radial extent of the outer filler strip. The total bead mass is reduced by as much as 15 percent and rolling resistance is reduced by as much as 5 percent for the reduced bead mass tire of this invention.

20 Claims, 5 Drawing Sheets

TIRE WITH REDUCED BEAD MASS

BACKGROUND OF THE INVENTION

1. Field of the invention

This invention relates to radial pneumatic tires used for light to heavy vehicles, and more particular to the design of the lower sidewall and bead area to reduce bead mass and rolling resistance with no substantial effect on load supporting capability.

2. Description of the Art

The continued interest in saving the amount of fuel consumed by vehicles has resulted in a need to reduce vehicle mass. This is true for all components of the vehicle, including the tires. However, vehicles are going faster, supporting heavier loads and cornering at higher speeds than ever before. Hence, as the need to reduce tire mass is stronger, the need to support the same or higher loads with the same size tire remains. The problem is that a reduction in tire mass is known to generally yield a reduction in the ability of the tire to support loads. Another important need is to reduce the rolling resistance of tires. Rolling resistance relates directly to fuel consumption and, generally speaking, rolling resistance decreases as tire mass decreases.

A part of the tire that has increased in mass over the years is the lower sidewall and bead areas. The beads transfer the loads from the tire's contact with a ground surface to the rim of the vehicle. The need of modern vehicles, due to their power and maneuverability, to require normal and lareral loads to be transferred more efficiently by the tire to the rim is known. Increased lower sidewall and bead mass is a result of adding additional components and/or making the classical components larger to support higher loads, and to support them more effectively. One component that has been made larger is the bead filler. Additional components include a large outer filler strip. Historically, this trend toward a higher bead mass is illustrated by U.S. Pat. Nos. 1,918,539; 3,052,275; 4,872,497; and 5,085,260.

U.S. Pat. No. 1,918,539 shows a tire with a very small bead mass resulting from smaller structural components required to resist a reduced tire loading. The bead core has a cross-woven fabric cover surrounding it and an intermediate layer of cord fabric. This was probably adequate for the tire loadings of 1931.

Additional components are shown to be added to the bead in U.S. Pat. No. 3,052,275. The carcass layers were anchored around each bead, an apex filler was added above each bead core and an outer filler strip was also added externally of the carcass plies. The tire of U.S. Pat. No. 3,052,275 improved the resistance to ply separation in the bead consistent with the tire loads of 1962.

Durability of the tire described in U.S. Pat. No. 4,872,497 was improved in the bead area by the addition of a relatively large outer filler strip along with a smaller apex filler. The relative dimensions of the apex filler are related to the height of a flange of the vehicle rim in this 1989 patent.

The heavy duty radial tire of U.S. Pat. No. 5,085,260 discloses a smaller apex filler along with a number of carcass layers turned up around the bead core. The length of carcass turn-up portions and the position of the bead core in relation to the rim flange height is used to obtain bead strength. Accuracy in the placement of end points of each carcass layer is important in the teachings of this 1992 patent.

Further components which were often added to the beads to strengthen them and to improve bead endurance are as disclosed in U.S. Pat. Nos. 4,726,408; 4,779,659; and 5,007,472. Components include additional textile reinforced plies around the bead core, textile reinforced cord layers to support the outer filler strip and multiple layers of outer filler strips. These components can provide a relatively small bead of sufficient strength and durability. However, they result in a bead construction which is very complicated to manufacture; and their use requires extreme care to insure uniformity of the tires. The need to have a relatively small bead capable of ease of manufacture and with adequate strength and durability remains. The ability to use standard components and manufacturing techniques is essential in having a cost effective product.

Changing the shape and dimensions of standard components in the lower sidewall and bead of a tire can affect their ability to resist higher forces and moments. One component which can be easily modified is the bead filler. A bead filler which has been extended radially into the area of the sidewall in U.S. Pat. Nos. 4,640,329; 4,766,940; and 5,048,584. This extension provides improved transverse and radial load supporting capabilities for the tire.

The motorcycle tire of U.S. Pat. No. 4,640,329 has a hard bead filler with a gradually decreasing thickness extending into the sidewall portions of the tire. This tire is claimed to have an improved transverse stiffness and is resistant to cracks in the tread grooves.

The bead filler of U.S. Pat. No. 4,766,940 extends to a mid-sidewall end position and has a gradually decreasing thickness from the bead core to its end position. An additional layer, including reinforcing cords, closely adheres to the bead filler to improve the steering stability (lateral forces) of the tire. The bead filler of U.S. Pat. No. 5,048,584 also extends radially into the mid-sidewall area of the tire. At least two sets of bead reinforcing layers are added to improve the durability of the bead. An outer filler strip is also used in this tire to partition the reinforcing layers.

Even with these changes the need remains to have a lower sidewall and bead structure which has a reduced mass without compromising the ability to sustain the same vehicle loads and without the necessity of added reinforcing layers or other non-standard tire components. A coexisting need is to obtain lower rolling resistance of the tire. Both of these needs should be achieved while maintaining a manufacturing process with limited changes or added costs.

SUMMARY OF THE INVENTION

An object of the invention is to reduce the overall mass of a tire by removing material from the lower sidewall and bead areas, without compromising the tire's load supporting capabilities.

Another object of the invention is to reduce the rolling resistance of a tire by reducing the amount of material having higher energy dissipation characteristics. This is to be accomplished by a reduction of the mass and a better selection of material properties for some components in the lower sidewall and bead areas of the tire; consistent with the first objective.

A further object is to overcome the disadvantages previously discussed where the historical trend is to increase the mass of the tire to sustain higher loads by increasing the size of components and by adding additional components in the bead area.

The tire of this invention is easily mounted on its design rim for normal operation of a vehicle. The tire is useful for many vehicles including passenger cars, light trucks, trucks and the like. The tire has a tread portion for contacting a ground surface and a belt package interior to the tread portion for support of the tread. The tire has a pair of sidewall portions each extending radially inward from a lateral edge of the belt package. A pair of beads each have a bead core and are positioned radially inward of a respective sidewall portion.

The tire of this invention also has a outer carcass ply positioned interior to the belt package which extends from bead to bead. The outer carcass ply terminates at each end adjacent to a respective bead core. An inner carcass ply is positioned interior to the outer carcass ply and extends from bead to bead. Each respective end portion of the inner carcass ply has a turn-up portion that partially encompasses a respective bead core and extends radially outward to an end point radially outward of a flange of the rim. When the tire is mounted on the rim. An innerliner ply is positioned in the tire to the inside of the inner carcass ply and forms the inner surface of the tire.

A single bead filler portion of each bead has a first apex part radially outward of the bead core, a second essentially constant thickness part radially outward of the apex part and a third tapered part radially outward of the constant thickness part. The single bead filler extends radially outward from a bead reference a distance at least equal to 30 percent of a radial height of the tire from the same bead reference, the bead reference being a line parallel to the rotational axis of the tire and tangent to the radially innermost surface of the bead core.

An outer filler strip of the tire at each bead is positioned axially outside of the carcass plies and the respective single bead filler portion. The outer filler strip extends radially outward from a lower end point radially inward of the flange of the rim when the tire is mounted on the rim to an upper end point radially outward of the bead reference a distance of at least 30 percent of the radial height of the tire.

A structural feature of one embodiment of the invention is that the single bead filler portions extend a radial distance from the bead reference which is greater than the radial extent of the carcass turn-up portions and less than the radial extent of the outer filler strips both from the bead reference.

Another embodiment of this invention is a structure wherein the outer filler strips extend a radial distance from the bead reference which is greater than the radial extent of the carcass turn-up portions and less than the radial extent of the bead filler portions both from the bead reference.

BRIEF DESCRIPTION OF THE DRAWINGS

Further features of the present invention will become apparent to those skilled in the art to which the present invention relates from reading the following with reference to the accompanying drawings, in which.

DETAILED DESCRIPTION OF THE PREFERRED EMBODIMENTS

Figure 1:
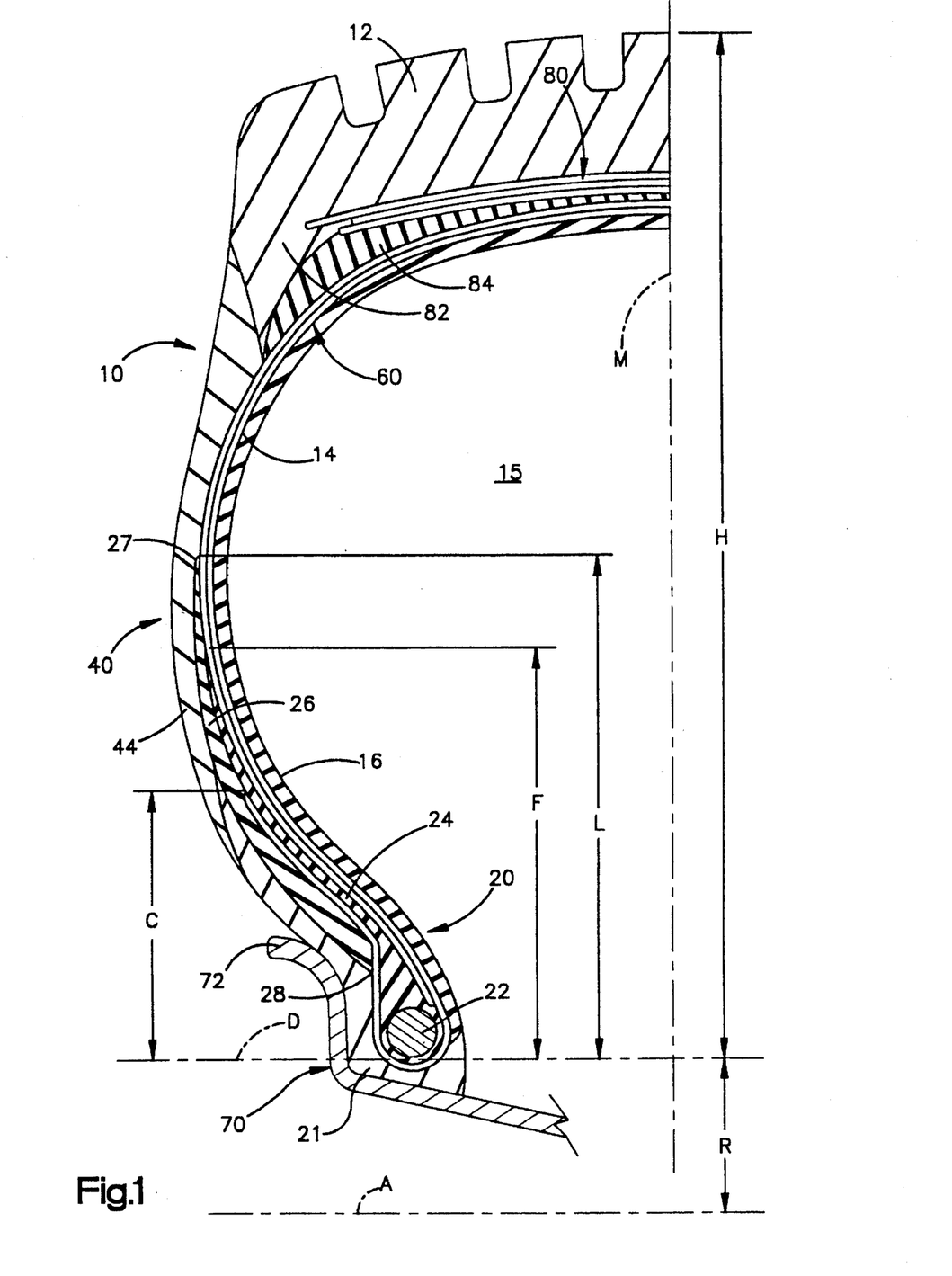
FIG. 1 is a sectional view of one half of a radial tire for a vehicle according to the invention.

The tire of this invention is illustrated in FIG. 1. The tire 10 has a tread 12 that engages the ground surface during running of the vehicle. A belt package 80 helps support the tread and provides resistance to normal and lateral loads on the tire 10. Two sidewall portions 40 connect the belt package 80 and tread 12 with the beads 20 on each axial side 82 of the tire. Only half of the tire 10 is illustrated in FIG. 1 with respect to the midcircumferential plane M. The tire 10, when mounted on its design rim 70, rotates about an axis A of rotation to provide mobility for the vehicle when contacting a ground surface.

The tire has an overall height H above a bead reference D, which is located at a radius R from the rotational axis A, and is parallel to the rotational axis. A bead core 22 helps support the tire on the rim 70 during operation of the vehicle. The bead reference D is tangent to the radially innermost surface of a bead core 22.

Inner and outer radial carcass plies 60 extend axially and radially from one bead core 22 to the axially spaced apart other bead core (not shown). The outer carcass ply terminates at a point adjacent to the bead core and the inner carcass ply partially encompasses the bead core 22 and is turned up to a radial distance C above the bead reference D. An innerliner ply 14 helps the tire retain air in its internal cavity 15 and forms the interior surface 16 of the tire 10. The parallel reinforcing members in each carcass ply cross each other from ply to ply and are positioned radially at an angle of about 75 to about 90 degrees from the midcircumferential plane M. The carcass reinforcing members are of a metallic or textile material which is standard in the industry.

Two essential components necessary to obtain a tire with reduced bead mass according to this invention are the bead filler portion 24 and the outer filler strip 26. The bead filler portion 24 is a single profiled component having been reduced in thickness to help achieve the objects of this invention. The outer filler strip 26 may be profiled and is positioned within the tire to help achieve the uncompromised load supporting requirements of the tire. A further discussion and disclosure of these essential components is included later in this description.

Rolling resistance is directly related to energy loss per stress-strain cycle of all the component parts of the tire as they roll through contact with the ground surface. This cyclic energy loss, and therefore the rolling resistance, can be decreased by using materials in the tire which have low energy loss properties and by reducing the amount of mass that is subjected to this cyclic energy loss. Reduced rolling resistance of the tire 10 of this invention is achieved by an overall mass reduction in the lower sidewall and bead areas. Selecting material properties to reduce rolling resistance is also within the scope of this invention. Optimum material properties of the bead fillers 24 and the outer filler strips 26 are essential in achieving a smaller resistance force that inhibits the tire from free rolling (lower rolling resistance). Properties of these two components are disclosed herein.

Many of the materials used for components contained in the tire 10 of this invention are known in the industry. The tread 12 is of any rubber tread compound having a relatively low energy loss during stress cycles and being durable against wear, abrasion and aging. The belt package 80 has at least two belt plies with parallel reinforcing members in each ply that cross one another from ply to ply. Belt reinforcing members can be of a metallic or textile material standard in the art. The sidewall rubber 44 and innerliner ply 14 are also made of any material suitable in the art. The bead core 22 is made of a steel material being a cable or bundle of wires circumferentially positioned in a hoop within the tire and extending around the rim to keep the tire 10 seated on the rim 70. A bead seat rubber 21 provides the interface contact with the rim 70 and is made of any suitable bead seat material standard in the industry. This bead seat rubber extends radially outward into the lower portion of the sidewall, and interfaces the innerliner ply 14 on the axially interior side of the bead core 22. The bead seat rubber 21 may also be a combination of rubber components each known for their particular location requirements.

Figure 2:
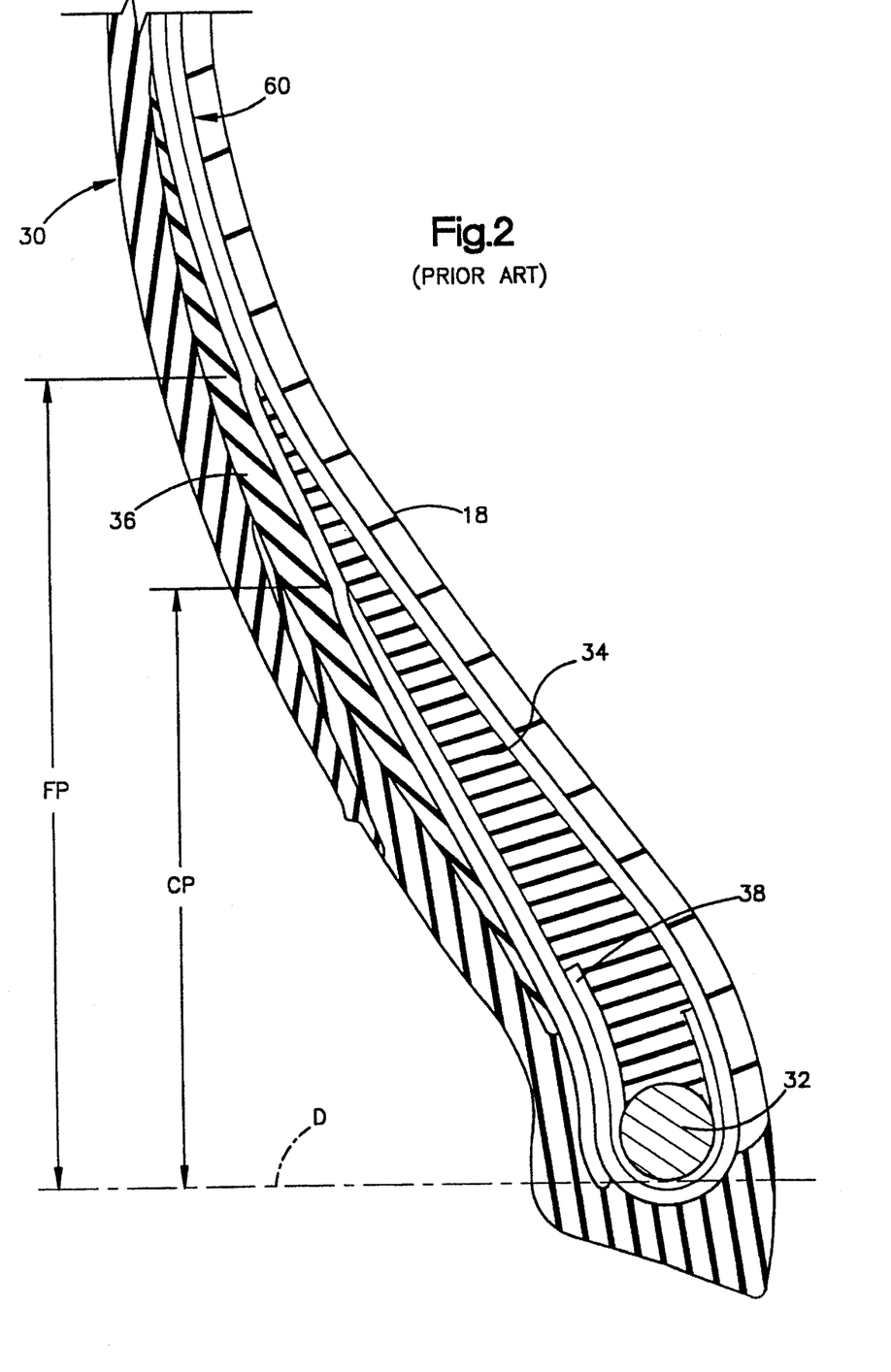
FIG. 2 is a partial sectional view illustrating a lower sidewall and bead arrangement of a prior art tire.

The lower sidewall and bead areas of this invention replace those of the prior art tire illustrated in FIG. 2. This typical tire 30 is used for a light truck vehicle and has standard components plus a bead flipper 38 to help support the loads. The two carcass plies 60 are divided at the apex bead filler 34 to extend radially inward on both axial sides of the apex filler 34. The interior carcass ply is turned up around the bead core 32 and extends radially outward a distance CP from the bead reference D. The apex filler 34 extends radially outward a distance FP from the bead reference D. An outer filler strip 36 is also required for this prior art tire 30 to sustain the loads from the vehicle.

The subsequent illustrations (FIGS. 3 and 4) show how the bead mass of the tire 20 of this invention compares with this prior art tire 30. For comparison, interior surface 18 shows the larger envelope of the prior art tire 30 as depicted in FIG. 2.

Figure 3:
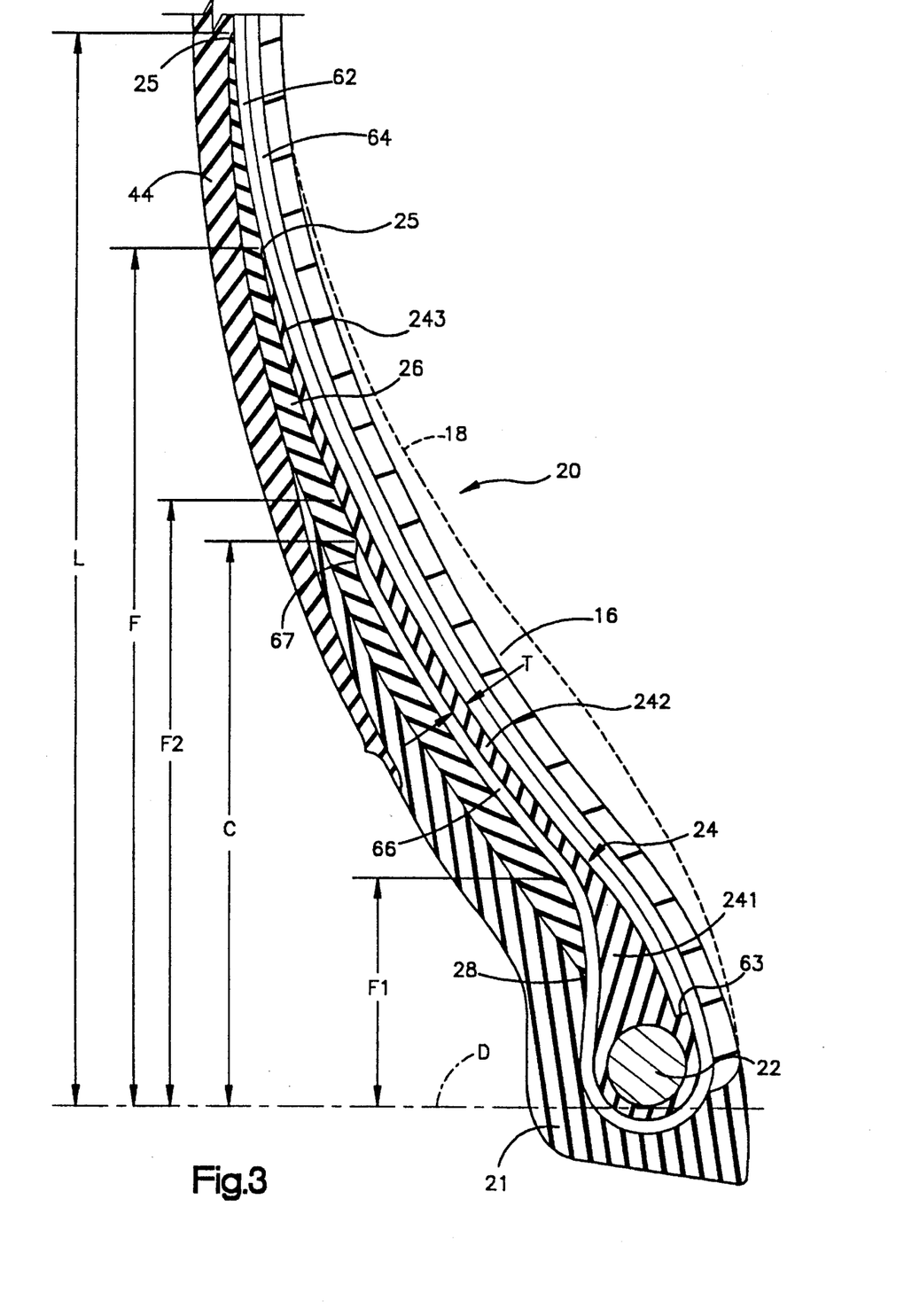
FIG. 3 is a partial sectional view illustrating a lower sidewall and bead arrangement for one embodiment of the invention.

The smaller lower sidewall and bead area of the tire of one embodiment of this invention is illustrated in FIG. 3. The outer carcass ply 62 extends radially inward to contact the inside of the bead filler 24 and terminates adjacent to the bead core 22. The inner carcass ply 64 extends radially inward to the inside of the filler 24, is wrapped around the bead core 22 to partially encompass it and is turned up on the outside of the bead filler 24. The carcass turn-up portion 66 extends radially outward of the bead reference D a distance C to an end point 67. The preferred distance C was determined to be approximately equal to the distance CP of the prior art tire (FIG. 2). The preferred distance C to end point 67 is about 25 percent of the tire height H (FIG. 1).

The unique bead filler 24 of the tire 10 of this invention has three different parts. The bead filler 24 is a single component having a first apex part 241, a second essentially constant thickness part 242, and a third tapered part 243. The first apex part 241 extends radially outward from the bead reference a distance F1. Distance F1 is preferably in a range of 10 to 15 percent of the radial height H of the tire 10 (FIG. 1). The second essentially constant thickness part 242 extends radially outward a distance F2 from the bead reference D. The radial extent or length of the essentially constant thickness part 242 is F2-F1. The third tapered part 243 extends radially outward to end point 25 a distance F from the bead reference D. The radial extent or length of the tapered part 243 is F-F2. The radial length F2-F1 of the essentially constant thickness part 242 is in a range of about 30 percent to about 45 percent of the radial extend F of the bead filler 24. The preferred radial length F2-F1 of the essentially constant thickness part 242 is 40 percent of the radial distance F. The preferred range for the radial extent of the bead filler 24, being a distance F from the bead reference D, is at least 30 percent but not more than approximately 50 percent of the radial height H of the tire 10. The preferred radial distance F is about 45 percent of the radial height H.

The thickness T of the essentially constant thickness part 242 of the bead filler 24 is selected to provide adequate strength with a reduction in bead mass. Computer modeling of the tire of this invention was used to obtain good stiffness characteristics of the tire without exceeding the allowable stresses of the materials used to construct the tire 10. These models were verified by actual testing. The resulting optimum thickness T of the constant thickness part 242 was determined to be in a range of values of about 0.60 millimeters to about 1.60 millimeters. The most preferred value for a LT 225/75R16 tire size was about 0.80 millimeters, for example 0.80 millimeters.

An essential outer filler strip 26 of the tire 10 of this invention is also illustrated in FIG. 3. The position and radial extend of this outer filler strip 26 are determined to provide the necessary structural support to the bead and lower sidewall of the tire for sustaining the vehicle loads. The outer filler strip 26 extends from a lower end point 28, radially inward of the flange 72 of the rim 70 (FIG. 1), radially outward to an upper end point 27. The radial extent L of the upper end point 27 from the bead reference D is not more than about 65 percent of the height H of the tire from the bead reference D. The preferred outward radial extent L of the outer filler strip 26 from the bead reference D is approximately 50 percent of the height H of the tire 10.

The relative radial position of the end point 25 of the bead filler 24 is radially outward of the end 67 of the carcass turn-up 66 and radially inward of the upper end point 27 of the outer filler strip 26. The radial distance separating end points 25, 67, and 27 is at least 5 millimeters for the tire 10 of this invention.

Both the bead filler 24 and the outer filler strip 26 are made of a relatively hard rubber compound material. The radial and lateral stiffness of the tire are increased by a material having a higher modulus of elasticity for the bead filler 24 and outer filler strip 26. A value of as high as approximately 10 megaPascals (MPa) for the modulus of elasticity at a 100 percent unit strain for the material of both the bead filler 24 and outer filler strip 26 components can be used to provide the improved stiffnesses for the tire. This material has a Shore A hardness of approximately 95 degrees. In addition to stiffness, the performance parameters of ride, comfort, and handling are important for the tire 10. Therefore, a value as low as approximately 4 megaPascals for the modulus of elasticity at 100 percent unit strain for the material of both components 24 and 26 can be used to achieve a balance between stiffness and ride/handling. This lower modulus material has a Shore A hardness of approximately 75 degrees.

Figure 4:
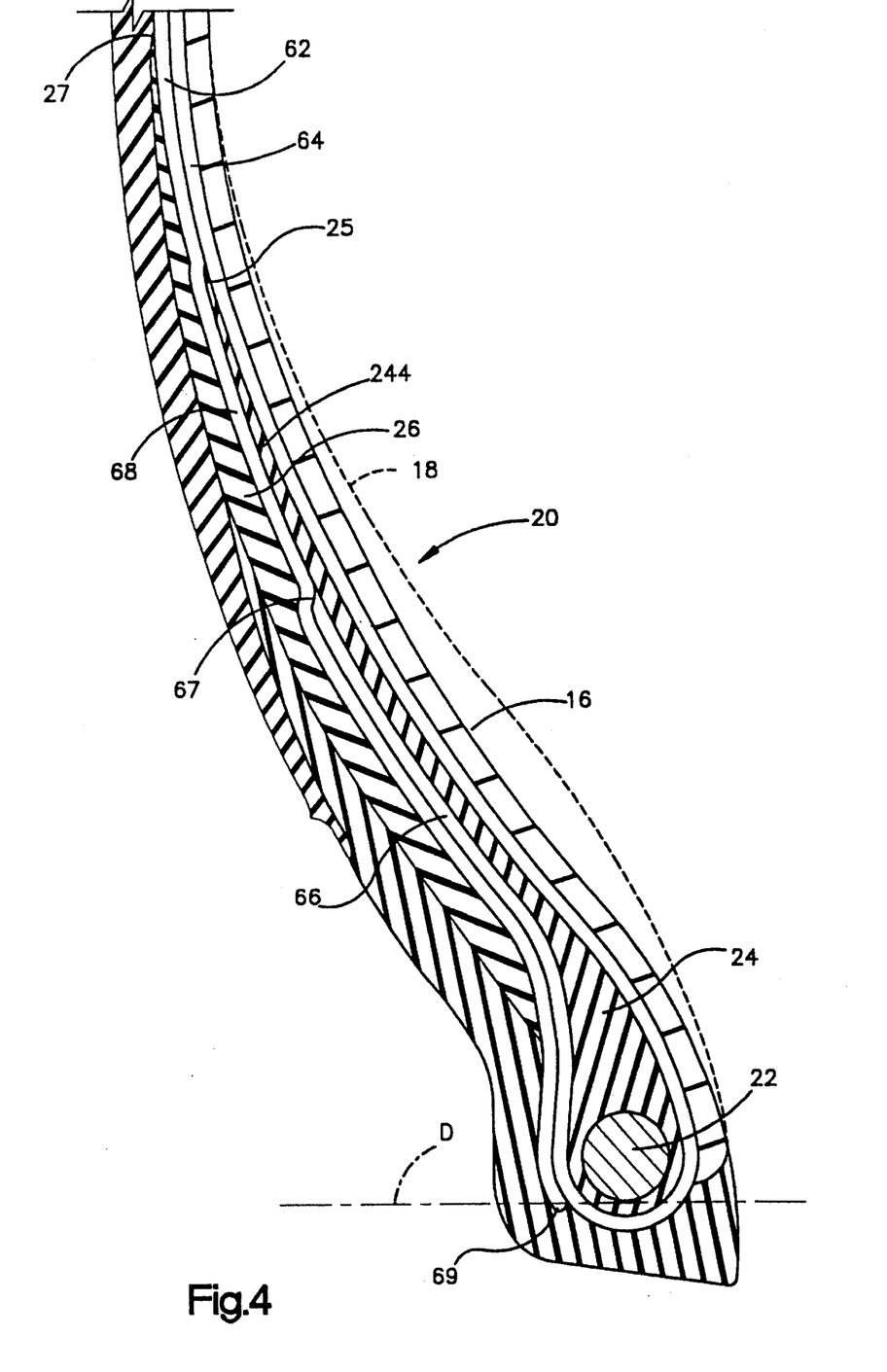
FIG. 4 is a partial sectional view illustrating a lower sidewall and bead arrangement for another embodiment of the invention.

Another embodiment of the tire 10 of this invention is illustrated in FIG. 4. This embodiment is very similar to the tire 10 illustrated in FIG. 3, except for the position of the outer carcass ply 62. In this embodiment, the outer carcass ply 62 is positioned to contact the axially outermost side of the bead filler 24 and the inner carcass ply turn-up portion 66. The outer carcass ply extends radially inward to an end point 69 adjacent to the bead core 22 being on the outermost axial side of the bead core. An intermediate portion 68 of the outer carcass ply 62 is in contact with a radial outermost portion 244 of the bead filler 24. This embodiment has approximately the same performance as the embodiment illustrated in FIG. 3, as shown in the example included herein.

Figure 5:
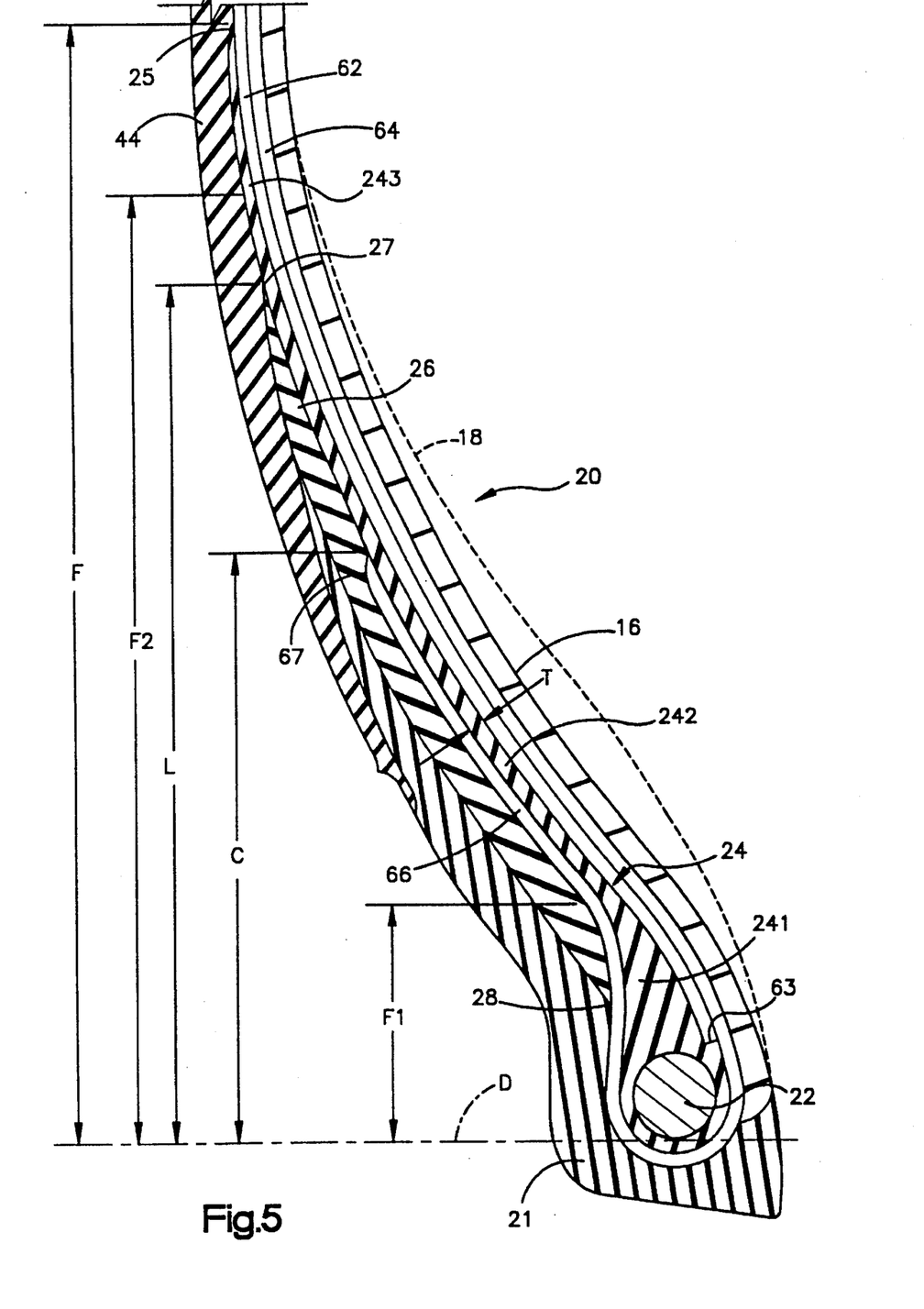
FIG. 5 is a partial sectional view illustrating a lower sidewall and bead arrangement for yet another embodiment of the invention.

In yet another embodiment of this invention the outward radial extent of the bead filler 24 is greater than the outward radial extent of the outer filler strip 26, as illustrated in FIG. 5. Basically, the radial extent of these two components have been interchanged in this embodiment of a tire 90 compared to the other embodiment shown as tire 10 of this invention. The outer carcass ply 62 extends radially inward to the inside of the bead filler 24 in this embodiment, and terminates at end point 63 adjacent to the bead core 22. The inner carcass ply 64 extends radially inward to the inside of the bead filler 24 and is partially wrapped around the bead core 22. The inner carcass ply 64 has a turned up portion 66 that extends to an end point 67 at a distance C radially outward from the bead reference D. The perferred distance C to end point 67 is about 25 percent of the height H of the tire (FIG. 1).

The unique bead filler 24 embodiment illustrated in FIG. 5 also has three parts being a first apex part 241, a second essentially constant thickness part 242 and a third tapered part 243. The outward radial distance F1 of the extent of the first apex part 241 is about 10 to about 15 percent of the outward radial height H of the tire 90 from the bead reference D. The second essentially constant thickness part 242 extends radially outward a distance F2; and its radial length F2-F1 is in a range of about 50 percent to about 65 percent of the total radial extent F of the bead filler 24 from the bead reference D. The total radial extent F of the bead filler 24 is at least 40 percent but not more than approximately 65 percent of the radial height H of the tire 90. The preferred radial extent F of the bead filler 24 is about 50 percent of the tire height H. The third tapered part 243 decreases in thickness radially outward to an end point 25.

The thickness T of the essentially constant thickness part 242 is once again in a range of about 0.60 millimeters to about 1.60 millimeters. The most preferred thickness T is about 0.80 millimeters.

The essential outer filler strip 26 illustrated in the embodiment of FIG. 5 extends radially outward to an upper end point 27 a radial distance L from the bead reference D. The distance L for this embodiment is at least 30 percent but not more than approximated 50 percent of the height H of the tire (FIG. 1). The preferred radial distance L for this embodiment is approximately 45 percent of the tire height H. The lower end point 28 of this outer filler strip 26 is radially inward of the flange 72 of the rim 70. Other components of this embodiment of the tire 90 are essentially the same as those of the tire 10 illustrated in FIGS. 1 and 3. The embodiment illustrated in FIG. 5 has a bead filler 24 with its essentially constant thickness part 242 extended and the outer filler strip 26 being reduced in its radial extent an approximately equal amount to become more suitable for other tire sizes, or to best support other loading environments.

The tire of this invention, having been described herein, has a bead mass much less than the prior art tires. The dashed line in FIG. 3 illustrates the relative position of the interior surface 18 of the prior art tire 30 of FIG. 2 in respect to the interior surface 16 of the tire 10 of this invention. An identical comparison can be made for the embodiment of the tire 20 illustrated in FIG. 4 where the interior surface 18 of the prior art tire 30 is shown relative to the interior surface 16 of the tire 10 of this invention. A reduction in the total mass of the lower sidewall and bead areas, as illustrated in FIGS. 3 and 4, as high as 15 percent was achieved. This magnitude of reduction is significant in the tire art.

EXAMPLES

Tires were built such as those illustrated in FIG. 2 (prior art) and FIGS. 3 and 4 (embodiments of this invention) and were measured and tested to determine their relative mass, rolling resistance, radial stiffness, cornering stiffness, dynamic spring rate, high speed endurance and ride/handling performance. A light truck tire having a standard LT 225/75R16 size, as determined by the Tire and Rim Association (T&RA) of Copley, Ohio, was selected for each tire. Tire A is the prior art witness tire having the structure illustrated in FIG. 2. Tire B is the preferred tire 10 as illustrated in FIG. 3 and tire C is the tire 10 illustrated in FIG. 4. The table shows a comparison based on the prior art tire having a base value of 100 for each feature or performance value. The modulus of elasticity of the bead filler 24, 34 as well as the outer filler strip 26, 36 was 4.6 megaPascals at 100 percent unit strain and the Shore A hardness was 78 for the example test tires.

| Feature or Performance | Tire A Prior Art | Tire B (FIG. 3) | Tire C (FIG. 4) |
|---|---|---|---|
| Mass (weight) | 100 | 96 | 95 |
| Rolling Resistance | 100 | 97 | 97 |
| Radial Stiffness | 100 | 96 | 95 |
| Cornering Stiffness | 100 | 97 | 97 |
| Dynamic Spring Rate | 100 | 96 | 95 |
| High Speed Limit | 100 | 98 | 97 |
| Ride/Handling | Base | Slightly Worse | Slightly Better |

The table shows a reduction in the mass of the tire from 4 to 5 percent with the tires B and C of this invention. The rolling resistance is also decreased by 3 percent for tires B and C of this invention. This rolling resistance can result in a fuel savings as much as one percent for a light truck vehicle. The ability of the tires B and C of this invention to substantially sustain the radial and lateral (cornering) loads from the vehicle are verified by only a 3 to 5 percent reduction in stiffness values. The same result is obtained for the dynamic spring rate comparisons. Endurance of the tires B and C of this invention are measured by a high speed endurance comparison; which shows a 2 to 5 percent reduction. The measured decrease of only 2 to 5 percent in these parameters is considered insignificant for most applications in the tire business. Hence, the ability of the tires A & B of this example to have substantially uncompromised load supporting and endurance or performance capabilities is verified. Similar tests with other tire sizes have also shown the improvements and uncompromised performance disclosed for the tire of this invention. The embodiment of the tire of FIG. 5 was also tested and results indicate similar mass and rolling resistance improvements along with essentially equal stiffness, endurance and ride/handling performance when compare with the witness tire A.

The relative changes for mass and rolling resistance magnitudes are approximately equal to the relative changes in the magnitude of stiffness and endurance values (3% to 5%). However, a 3 to 5 percent change in mass and rolling resistance is much more significant. Such a percent change is known to be difficult to achieve in the art, and is very important for economocal operation of vehicles (fuel consumption). The 3 to 5 percent reduction in stiffness and high speed limit (endurance) of the tire of this invention will not be noticable to most drivers. In fact, some drivers may prefer the change in ride comfort resulting from the radial stiffness decrease.

The ride, comfort, and handling performance of tire C (FIG. 4) was somewhat better than the prior art witness tire A (FIG. 2). Alternately, the ride, comfort, and handling performance of tire B (FIG. 3) was somewhat worse than the prior art witness tire A. The relative performance values of all three tires A, B, and C were essentially equal in ride, comfort and handling.

From the above description of preferred embodiment of the invention, those skilled in the art will perceive improvements, changes, and modifications. Such improvements, changes, and modifications within the skill of the art are intended to be covered by the appended claims.

What is claimed is:

1. A tire for mounting on its design rim comprising:

a tread portion for contacting a ground surface;

a belt package to support the tread portion and positioned interior to the tread portion;

a pair of sidewall portions each extending radially inward from a lateral edge of the belt package;

a pair of beads each having a bead core and positioned radially inward of a respective sidewall portion;

an outer carcass ply positioned interior to the belt package and extending from bead to bead with respective ends terminated adjacent each bead core;

an inner carcass ply positioned interior to the outer carcass ply and extending from bead to bead with each respective end portion having a carcass turn-up portion that partially encompasses a respective bead core and extends radially outward to an end point positioned radially outward of a flange of the rim when the tire is mounted on the rim;

an innerliner ply positioned to the inside of the inner carcass ply forming the inner surface of the tire;

a single bead filler portion of each sidewall portion and bead having a first apex part radially outward of the bead core, a second essentially constant thickness part radially outward of the apex part and a third tapered part radially outward of the essentially constant thickness part, wherein said single bead filler portion extends radially outward from a bead reference a distance of at least 30 percent of a radial height of the tire from the same bead reference, the bead reference being a line parallel to the rotational axis of the tire and tangent to the radially innermost surface of the bead core; and an outer filler strip of each sidewall portion and bead positioned axially outside of the carcass plies and the respective single bead filler portion and extending radially outward from a lower end point being radially inward of the flange of the rim when the tire is mounted on the rim to an upper end point being radially outward of the bead reference a distance of at least 30 percent of the radial height of the tire.

2. The tire set forth in claim 1, wherein the single bead filler portions extend a radial distance from the bead reference which is greater than the extent of the carcass turn-up portions and less than the extent of the outer filler strips both from the bead reference.

3. The tire set forth in claim 2, wherein the single bead filler portions extend a radial distance from the bead reference to an end point which is not more than approximately 50 percent of the radial height of the tire.

4. The tire set forth in claim 2, wherein the upper end point of each outer filler strip extends a radial distance from the bead reference which is not more than about 65 percent of the radial height of the tire.

5. The tire set forth in claim 1, wherein the second essentially constant thickness part of each single bead filler portion has a radial length of about 30 to about 45 percent of the total radial distance that the respective single bead filler portion extends above the bead reference.

6. The tire set forth in claim 1, wherein a thickness of the second essentially constant thickness part of each single bead filler portion is in a range of about 0.60 millimeters to about 1.60 millimeters.

7. The tire set forth in claim 6, wherein the thickness of the second essentially constant thickness part of each single bead filler portion is about 0.80 millimeters.

8. The tire set forth in claim 1, wherein the single bead filler portions are made of a rubber material having a Shore A hardness in a range of approximately 75 to approximately 95 degrees and a modulus of elasticity at 100 percent unit strain in a range of approximately 4 to approximately 10 megaPascals.

9. The tire set forth in claim 1, wherein the outer filler strips are made of a rubber material having a Shore A hardness in a range of approximately 75 to approximately 95 degrees and a modulus of elasticity at 100 percent unit strain in a range of approximately 4 to approximately 10 megaPascals.

10. The tire set forth in claim 1, wherein the outer carcass ply is positioned axially inside of and in contact with the single bead filler portion in each respective sidewall portion and bead.

11. The tire set forth in claim 1, wherein the outer carcass ply is positioned axially outside of and in contact with the single bead filler portion and the carcass turn-up portion in each respective sidewall portion and bead.

12. A tire for mounting on its design rim comprising:

a tread portion for contacting a ground surface;

a belt package to support the tread portion and positioned interior to the tread portion;

a pair of sidewall portions each extending radially inward from a lateral edge of the belt package;

a pair of beads each having a bead core and positioned radially inward of a respective sidewall portion;

an outer carcass ply positioned interior to the belt package and extending from bead to bead with respective ends terminated adjacent each bead core;

an inner carcass ply positioned interior to the outer carcass ply and extending from bead to bead with each respective end portion having a carcass turn-up portion that partially encompasses a respective bead core and extends radially outward to an end point positioned radially outward of a flange of the rim when the tire is mounted on the rim;

an innerliner ply positioned to the inside of the inner carcass ply forming the inner surface of the tire;

a single bead filler portion of each sidewall portion and bead having a first apex part radially outward of the bead core, a second essentially constant thickness part radially outward of the apex part and a third tapered part radially outward of the essentially constant thickness part, wherein said single bead filler portion extends radially outward from a bead reference a distance of at least 40 percent of a radial height of the tire from the same bead reference, the bead reference being a line parallel to the rotational axis of the tire and tangent to the radially innermost surface of the bead core; and an outer filler strip of each sidewall portion and bead positioned axially outside of the carcass plies and the respective single bead filler portion and extending radially outward from a lower end point being radially inward of the flange of the rim when the tire is mounted on the rim to an upper end point being radially outward of the bead reference a distance of at least 30 percent of the radial height of the tire.

13. The tire set forth in claim 12, wherein the outer filler strips extend a radial distance from the bead reference which is greater than the extent of the carcass turn-up portions and less than the extent of the single bead filler portions both from the bead reference.

14. The tire set forth in claim 13, wherein the single bead filler portions extend a radial distance from the bead reference to an end point which is not more than approximately 65 percent of the radial height of the tire.

15. The tire set forth in claim 13, wherein the upper end point of each outer filler strip extends a radial distance from the bead reference which is not more than approximately 50 percent of the radial height of the tire.

16. The tire set forth in claim 12, wherein the second essentially constant thickness part of each single bead filler portion has a radial length of about 50 to about 65 percent of the total radial distance that the respective single bead filler portion extends above the bead reference.

17. The tire set forth in claim 12, wherein a thickness of the second essentially constant thickness part of each single bead filler portion is in a range of about 0.60 millimeters to about 1.60 millimeters.

18. The tire set forth in claim 17, wherein the thickness of the second essentially constant thickness part of each single bead filler portion is about 0.80 millimeters.

19. The tire set forth in claim 10, wherein the outer filler strips extend a radial distance from the bead reference which is greater than the extent of the carcass turn-up portions and less than the extent of the single bead filler portions both from the bead reference.

20. The tire set forth in claim 10, wherein the single bead filler portions extend a radial distance from the bead reference which is greater than the extent of the carcass turn-up portions and less than the extent of the outer filler strips both from the bead reference.

\* \* \* \* \*